United States Patent [19]
Beigler et al.

[11] 3,898,328
[45] Aug. 5, 1975

[54] DRY STABLE COMPOSITION FOR THE TREATMENT OF SCOURS AND DEHYDRATION

[75] Inventors: Myron A. Beigler, Palo Alto; Sidney Saperstein, Menlo Park; Subramanian S. Shastri, Cupertino, all of Calif.

[73] Assignee: Syntex (U.S.A.) Inc., Palo Alto, Calif.

[22] Filed: Dec. 3, 1973

[21] Appl. No.: 421,360

[52] U.S. Cl. ............... 424/128; 424/153; 424/154; 424/180; 424/319
[51] Int. Cl. ........................................ A61k 27/00
[58] Field of Search ........................... 424/153, 128

[56] References Cited
OTHER PUBLICATIONS
Veterinary Drug Encyclopedia–12th edit. (1964) page 179.

U.S. Dispensatory–25th edition (1955) pages 63 and 64.

Primary Examiner—Albert T. Meyers
Assistant Examiner—Norman A. Drezin
Attorney, Agent, or Firm—Lawrence S. Squires; William B. Walker

[57] ABSTRACT

Methods and rehydration compositions for treating, or reducing the frequency of scours and/or tetany, in domestic mammals, e.g. calves, piglets, and the like. The rehydration compositions comprise glucose, glycine, and electrolytic salts and aqueous solutions thereof. The methods comprise the daily oral administration of aqueous rehydration compositions to domestic mammals. In a further embodiment, storage compositions are provided wherein the glucose component, of the rehydration composition, is packaged separately.

3 Claims, No Drawings

DRY STABLE COMPOSITION FOR THE TREATMENT OF SCOURS AND DEHYDRATION

BACKGROUND OF THE INVENTION

1. Field of the Invention

This invention relates to compositions and methods for treating calf scours and piglet scours or scours in other domestic mammals. In a further aspect, this invention relates to compositions of glycine, glucose, electrolytes and mineral salts, and aqueous solutions thereof, which are useful for treating scours in calves, piglets or other domestic mammals. In a still further aspect, this invention relates to methods of treating calf scours which comprise administering an aqueous solution containing glycine, glucose and electrolytes to calves suffering from scours and/or tetany, arising from mineral deficiency. In another aspect, this invention relates to the treatment of piglets suffering from scours and/or tetany, arising from mineral deficiency, which comprises the administration of an aqueous solution containing glucose, glycine and electrolytes. In still another aspect, this invention relates to the treatment of calves and piglets suffering from scours comprising administering the aforedescribed aqueous solution in combination with the administration of antibiotics which are active against the scours-causing organism. This invention also relates to the prophylactic administration of the aforementioned aqueous solutions to calves and piglets or other domestic mammals, for the purpose of preventing, or reducing the frequency of, scours or tetany arising from mineral deficiency.

2. The Prior Art

One of the most destructive and debilitating diseases affecting calves is scours. This is a severe form of diarrhea or dysentery which causes severe dehydration resulting in weight loss and frequently results in the death of the calf. Further, the disease is typically highly infectious and will spread through a given calf farm or area in epidemic proportion. At present, it is generally believed that calf scours is primarily caused by a viral agent and/or an upset in the bacteria equilibrium between calves and the environment or the intestinal tract. Once the balance is upset in favor of the virus or bacteria, this results in a rapid multiplication of the virus or bacteria. The significant bacterium is typically a potentially pathogenic strain of *Esherichia coli*. Accordingly, calf scours is generally treated in the United States by the administration of antibiotics such as, for example, ampicillin or combinations of ampicillin and nitrofurazone. Also, various other methods have been tried by the art such as, for example, increasing the quantity of colostrum consumed by the calf, thus increasing the amount of natural antibodies obtained from the mother. Also, the art has attempted to increase the quantity of vitamin A consumed by the calves, either by feeding the mother vitamin A and thus increasing the vitamin A content of the colostrum, or by feeding the calves separate rations of vitamin A. None of these methods, including the administration of antibiotics, has been sufficiently effective.

Hence, in spite of antibiotics, calves continue to die from scours and dehydration at the rate of up to 50% of those infected. Further, conventionally treated scouring animals may still develop hypoglycemia and ketosis and not rehydrate fast enough. Also, severe weight loss ensues which represents an economic loss to the producer. Accordingly, we have now discovered novel compositions and methods which are more advantageous than those of the prior art for curing or palliating calf scours and preventing tetany.

Similarly, piglets are also quite subject to scours and which, if not treated, will produce severe weight loss and frequently death (either directly caused by the scours or caused by secondary infections occurring because of the debilitated condition of the piglet). Typically, piglet scours has been treated by the administration of antibiotics such as tetracycline, sulfa drugs, nitrofurazone or nitrofurazone derivatives, and penicillin or penicillin derivatives, and also by the administration of various dietary regimens. None of these methods have proved to be satisfactory as death often results from dehydration. Also, U.S. Pat. No. 3,692,948 teaches that piglet scours can be cured by the administration of trans-4-amino-methylcyclohexane carboxylic acid; 4-amino-methylbenzoic acid; or ε-amino-caprylic acid, or by combinations of these compounds with various antibiotics. We have now discovered more advantageous methods of treating piglet scours even without the use of antibiotics or other antibacterials.

SUMMARY OF THE INVENTION

The composition of our invention has a dry form and an aqueous form. The dry form is primarily used for storage whereas the aqueous form is used for actual administration, and indeed the aqueous phase forms an important rehydration function. In summary, a major portion of the dry composition comprises glycine and glucose, in combination with a minor portion of electrolytes and mineral salts. In summary, the aqueous form of our invention comprises the dry form of the invention in aqueous solution; typically in a ratio of about from 20 to 50 grams per liter of water.

In summary, the method of our invention for treating calf scours and piglet scours comprises administering an aqueous solution comprising, based on the dry weight, a major portion of glycine and glucose in combination with a minor portion of mineral salts and having an osmolality of about from 280 to 600 milliosmoles per kilogram of water. An effective amount of the aqueous composition is administered. The aqueous composition of our invention is especially adapted for administration to calves and contains other components necessary for the nutritional well-being of the scouring calf in addition to the components necessary to affect rehydration and treatment of the scours.

The invention will be further described herein below.

FURTHER DESCRIPTION OF THE INVENTION AND PREFERRED EMBODIMENTS

The method of our invention for treating, or preventing, scours in calves and piglets comprises administering an effective amount of an aqueous solution having an osmolality of about from 280 to 600 milliosmoles per kilogram of water and containing about from 20 to 50 grams, per liter of water, of a rehydration transfer mixture containing glycine, glucose and one or more electrolytes. The rehydration transfer mixture contains, based on weight percent, about from 15 to 25%, preferably about from 18 to 22%, glycine; about from 45 to 60%, preferably about from 51 to 56%, glucose; and about from 10 to 20%, preferably about from 13 to 18%, pharmaceutically acceptable electrolytes. The composition and quantity of rehydration mixture added is adjusted to provide about from 0.7 to 2 grams of sodium ion per liter of aqueous solution. The upper limit of sodium ion should be carefully controlled since an excess of sodium ion may cause the subject mammal (e.g. calf) to develop hypernatremia. In addition, the transport mixture can also contain various other pharmaceutically compatible agents such as, for example, vitamins, mineral salts, buffers (e.g. sodium bicarbonate), neutral amino acids, antibiotics, or other pharmaceutically compatible agents useful for the particular animal or animals being treated. Suitable electrolyte ions which can be used include, for example, sodium, potassium, calcium, magnesium, manganese, chloride, and the like. These ions can be provided by suitable soluble pharmaceutically acceptable salts containing these ions such as, for example, sodium chloride, potassium chloride, calcium chloride, calcium gluconate, magnesium sulfate, sodium bicarbonate, sodium citrate, potassium citrate and the like.

The prefix term pharmaceutically acceptable or pharmaceutically compatible, as used herein above and below, refers to substances which do not significantly adversely affect the pharmaceutical properties (e.g. toxicity, effectiveness, physiological properties) of our compositions.

The particular dosage range can vary over relatively wide ranges but typically with respect to calves will be in the range of about from 2 to 4 liters per day per calf, and in the case of piglets will typically be in the range of about from one-fourth to one-half liter per day per piglet. The aqueous composition is administered orally and thus represents a further advantage over many of the other scours medicaments which are required to be administered parenterally. Typically, the composition is administered, in the case of calves, two to four times daily in equal regimens, and in the case of piglets, two times daily or ad libitum. Also, the composition can be administered in conjunction with the administration of antibiotics which are active against one or more scours-producing organisms, for example, penicillin, penicillin derivatives, tetracycline, tetracycline derivatives, nitrofurazone, nitrofurazone derivatives and the like.

Considering now the composition of the invention in greater detail, the dry form of the composition is a preferred form of the rehydration transfer mixture containing, based on weight percent, about from 15 to 25 %, preferably about from 18 to 22%, glycine; about 45 to 60%, preferably about 51 to 56%, glucose; about from 5 to 15%, preferably about from 7 to 12%, sodium chloride. Further, the ratio of components should be adjusted such that an aqueous solution of the composition has an osmolality of about from 280 to 800 milliosmoles per kilogram of water and preferably 280 to 450 milliosmoles per kilogram of water. Where storage is contemplated, it is preferable to use anhydrous glucose. In addition, as with the general rehydration transport mixture, the remaining portion of the composition can contain other pharmaceutically acceptable electrolytes as well as various pharmaceutically compatible agents such as, for example, vitamins, mineral salts, buffers (e.g. sodium bicarbonate, monopotassium phosphate), neutral amino acids, antibiotics, or other pharmaceutically compatible agents useful for the particular specie of mammal being treated, and excipients. Suitable excipients include, for example, magnesium aluminum silicate and the like. One preferred composition of our invention comprises, by weight percent, 18 to 25% glycine; 51 to 56% anhydrous glucose; 7 to 8 % sodium chloride; 0.5 to 1% calcium chloride (dihydrate); 0.8 to 1.2% magnesium chloride (hexahydrate); 6 to 7% potassium citrate and 9 to 11% sodium bicarbonate. Further, while we have found the combination of sodium chloride and potassium citrate-tribasic monohydrate to be particular desirable sources of electrolyte ions, other electrolytes or combinations of electrolytes could be used, for example, sodium bicarbonate, sodium glycerophosphate, potassium gluconate, monopotassium phosphate, and the like and mixtures thereof. Similarly, in place of potassium chloride and magnesium chloride, other pharmaceutically and physiologically acceptable soluble calcium and magnesium salts could also be used.

All of the components of our composition are known materials and can be prepared according to known procedures or obtained from commercial sources. The composition can be conveniently prepared by dry-blending the components according to any suitable blending or mixing procedure. Large scale quantities can be, for example, conveniently mixed or blended in "V" blenders, roller blenders, dry-mix blenders, and the like. It is recommended, however, that the blending and storage of the finished mixture be conducted under low humidity conditions, since the presence of water can cause caking and catalyze a reaction between the glycine and glucose components resulting in the formation of a hard caramel-like substance which is difficult to handle or work with and can reduce the product's effectiveness. Hence, it is very desirable to prevent this reaction and accordingly the moisture content of the final dry powder is typically held below 3% and preferably below 1%. Preferably, the dry composition should be stored in sealed containers or packages which are impervious to moisture to prevent atmospheric moisture from contacting the composition. Also, conventional desiccant package inserts or capsules can be used in conjunction with the sealed containers.

In view of this stability problem, we have further discovered that certain of our compositions have superior stabilities or shelf-life and thus are preferred where substantial storage periods are contemplated prior to use. Thus, we have found that compositions, of our invention, containing, by wt. percent, about from 20 to 23% glycine; 54 to 57% anhydrous glucose (e.g. dextrose); 10.5 to 12.5% sodium chloride; 8 to 10% monopotassium phosphate; 0.5 to 0.7% magnesium sulfate; and 2 to 2.4% calcium gluconate, have exceptionally superior storage properties or shelf-life. Also, compositions, of the invention, containing, by wt. percent, 19 to 22% glycine; 53 to 55% anhydrous glucose (e.g. dextrose); 6.5 to 8.5% sodium chloride; 4 to 5.5% potassium chloride; 9 to 11% sodium bicarbonate; 0.5 to 0.7% magnesium sulfate and 1.5 to 3% calcium gluconate have good storage properties (or shelf-life), though not as outstanding as the compositions described immediately above.

In a further embodiment of our dry composition, we have found that by omitting the glucose component from the dry storage composition and packaging it separately, the shelf-life of the composition is greatly increased. The respective packages can then be added to the aqueous solution immediately prior to use. Hence, we have found compositions corresponding to the aforedescribed superior storage compositions, but omitting the glucose component have even greater shelf-life. Thus, compositions containing, by wt. percent, 45 to 52% glycine; 23.4 to 28.2% sodium chloride; 18 to 22.5% monopotassium phosphate; 1.1 to 1.6% magnesium sulfate; and 4.5 to 5.3% calcium gluconate, and compositions containing, by wt. percent, 41 to 48% glycine; 12.2 to 18.6% sodium chloride; 8.7 to 12.1% potassium chloride; 19.7 to 24.2% sodium bicarbonate; 1.1 to 1.6% magnesium sulfate; and 3.3 to 6.6% calcium gluconate have extensive shelf-life and represent a further embodiment of the invention. Further, even though the glucose composition is packaged separately, it is still desirable that the moisture content of the primary composition be less than 3% wt. and preferably less than 1%. In actual practice, this embodiment can be conveniently facilitated by the use of single dosage or multi-dosage package sets having a first package or container containing a pre-measured quantity of the rehydration composition, save for the glucose component, and a second package or container containing the proper amount of glucose for the first container.

The aqueous form of our composition can be easily compared by simply dissolving about from 30 to 50 grams of the dry form of our composition in one liter of water, preferably immediately prior to administration. Alternatively, the aqueous composition could, be course, be prepared by dissolving the individual components, or sub-mixtures thereof. The aqueous composition is orally administered in the same manner and dosages as described herein above. Further, as previously noted, our composition is particularly useful with respect to the treatment of calves since magnesium salts and calcium salts are needed by calves to prevent tetany.

It is preferable to administer our aqueous composition as soon as the scours condition is detected, or even to administer the aqueous composition prophylactically, since once the scours has progressed too far, even our composition, in combination with antibiotics, may not be able to save the animals because of the severity of the infection and the weakened condition of the animal and secondary infections.

Although primarily useful with respect to calves and piglets, our methods and compositions can be applied to treat scours in a variety of domestic animals such as, for example, foals, lambs, goats, cats, dogs, horses, and the like.

The rehydration principle of this invention provides for electrolyte ion, for example sodium ion, transport of glycine and glucose. However, this invention also includes other neutral amino acids, such as alanine, along with glucose wherein the active transport of glucose and amino acids along with sodium, for example, carries along water and other electrolytes through the intestinal epithelium lumen membrane. Thus, in spite of an efflux of fluid through the epithelium into the intestinal lumen caused by viral agents or enterotoxins, the active transport principle allows for a reverse flux of fluid, energy, and electolytes, thus aiding in the rehydration of the scouring animal. The treatment may be considered in one aspect symptomatic since it relieves the adverse effects of the scours without itself attacking the scours-producing organisms, as in the case of antibiotics, yet at the same time, the treatment reestablishes the proper bacteria or viral balance by allowing the infected animal to regain sufficient strength to respond to and control the infection via its natural defenses or antibodies.

A further understanding of the invention can be had from the following non-limiting Examples.

EXAMPLE 1

This example illustrates the effectiveness of our method and composition for treating scours. In this example 50 male Holstein calves, about seven days old and weighing about 105 to 130 lbs., at the onset of scours were divided into four groups and treated for at least five days until complete cessation of scours as follows:

Group 1 — containing 12 calves were fed a test rehydration composition of our invention [about 180 grams (dry st.) daily] plus antibiotic [200 mg. ampicillin trihydrate I.M. given b.i.d. (twice daily) with 1 oz. nitrofurazone powder per os given b.i.d.] and commercial milk replacer given ad lib.

Group 2 — containing 13 calves were treated in the same manner as Group 1 but were not given milk replacer.

Group 3 — containing 12 calves were given only the test rehydration composition as in Group 1, but were not given antibiotics or milk replacer.

Group 4 — containing 13 calves were given antibiotics and milk replacer as in Group 1 but were not given the test rehydration diet.

Also each group of calves was allowed to feed ad lib on calf feed (sold under the trademark Startena by the Ralston Purina Company, of St. Louis, Missouri).

At the time scours began in each calf, fecal samples were obtained and examined for Coliform bacteria. The presence of Coliform bacteria was found in eight of the calves in Group 1; nine calves in Group 2; nine calves in Group 3 and eight calves in Group 4. The remaining calves all scoured but no positive diagnosis of a Coliform infection could be made.

One calf in Group 4 died on the third day from infectious scours (Coliform). The calves were periodically examined over the test period for general appearance; dehydration; body weight and weight loss, and clinical condition at the end of five days. The results of these examinations are shown in the following Tables.

General appearance: This parameter includes the appearance of hair coat, activity, appearance of well-being, etc. The results follow:

Table 3

| Group | Day After Start of Scours | | | | | | | | | | | | | | |
|---|---|---|---|---|---|---|---|---|---|---|---|---|---|---|---|
| | 1st | | | | 3rd | | | | 5th | | | | 12th | | |
| | E* | G* | P* | V* | E | G | P | V | E | G | P | V | E | G | P | V |
| 1 | 1 | 9 | 2 | 0 | 0 | 8 | 4 | 0 | 0 | 12 | 0 | 0 | 7 | 5 | 0 | 0 |
| 2 | 1 | 8 | 4 | 0 | 2 | 8 | 3 | 0 | 6 | 6 | 1 | 0 | 9 | 3 | 1 | 0 |
| 3 | 2 | 8 | 2 | 0 | 0 | 8 | 4 | 0 | 0 | 10 | 2 | 0 | 2 | 10 | 0 | 0 |
| 4** | 1 | 10 | 1 | 0 | 0 | 9 | 3 | 0 | 0 | 3 | 9 | 0 | 1 | 5 | 6 | 0 |

E* = Excellent
G* = Good
P* = Poor
V* = Very Poor
**Not including calf which died on third day of scours.

As can be seen, by day 5, Group 2 was superior to Group 1 and 3 and the latter two groups were superior to Group 4. By day 12, Groups 1 and 2 were superior to Group 3 and all groups treated with the test diet were superior to Group 4. Thus, it appears that the regimen with antibiotic and our test diet and total withdrawal of milk starter (Group 2) had the best effect followed closely by Groups 1 and 3 (both using our test formulation).

Dehydration: This parameter was determined by the investigator by observation. The results were:

Table 5

Days After Start of Scours

| Group | 1st Sv* | M* | Sl* | N* | Sv | 3rd M | Sl | N | Sv | 5th M | Sl | N |
|---|---|---|---|---|---|---|---|---|---|---|---|---|
| 1 | 2 | 9 | 1 | 0 | 0 | 7 | 5 | 0 | 0 | 4 | 5 | 3 |
| 2 | 5 | 7 | 1 | 0 | 2 | 9 | 2 | 0 | 0 | 2 | 6 | 5 |
| 3 | 2 | 9 | 1 | 0 | 1 | 9 | 2 | 0 | 0 | 2 | 6 | 4 |
| 4 | 0 | 11 | 1 | 0 | 5 | 7 | 0 | 0 | 2 | 10 | 0 | 0 |

Sv* = Severe
M* = Moderate
Sl* = Slight
N* = None

As can be seen, by day 3, there was a significant ($p<0.05$) difference between Group 4 and Groups 1, 2 and 3 (all with the test formulation). Similarly, on day 5, there was also a similar significant ($p<0.05$) difference. There was no difference in severity of dehydration between groups, 1, 2 and 3.

Body Weights (lbs): Body weights of each individual animal were obtained on day 1 (start of scours and regimen), day 3, day 5 and day 12.

1. Average body weights of those calves intially diagnosed by feces examination as having Coliform scours:

Table 7

| Group | Number of Calves | Day of Scours 1 | 3 | 5 | 12 |
|---|---|---|---|---|---|
| 1 | 8 | 118.5 | 113.6 | 112.1 | 113.5 |
| 2 | 9 | 117.0 | 112.6 | 112.1 | 112.1 |
| 3 | 9 | 119.3 | 114.2 | 114.4 | 113.1 |
| 4 | 7* | 116.1 | 110.1 | 107.0 | 105.7 |

*Dead animal not included in averages.

The slope of weight loss over time for Group 4 differs significantly ($p<0.001$) from the slopes for Groups 1, 2 and 3. This can be seen in that the drop in weight after day 3 ceases for the three test diet groups, but persists for Group 4 up to day 12.

2. Body weight of all calves on test:

As can be seen, the weight loss in Group 4 is not as severe when all animals are included in the analysis, whereas the loss in Groups 1, 2 and 3 is about the same (see Table 7).

Table 8

| Group | Number of Calves | Day of Scours 1 | 3 | 5 | 12 |
|---|---|---|---|---|---|
| 1 | 12 | 117.2 | 112.3 | 111.3 | 112.5 |
| 2 | 13 | 117.4 | 113.7 | 113.0 | 112.6 |
| 3 | 12 | 119.0 | 114.2 | 114.7 | 113.3 |
| 4 | 12* | 118.4 | 112.1 | 110.2 | 110.2 |

*Dead animal not included in average.

3. Weight loss (lbs) of initial Coliform diagnosed calves during study period:

Table 9

| Group | Number of Calves | Study Period (days) 1 thru 3 | 4 and 5 | 6 thru 12 | Average Total Loss Lbs |
|---|---|---|---|---|---|
| 1 | 8 | −5.0 | −1.4 | +1.4 | −5.0 |
| 2 | 9 | −4.4 | −0.7 | 0.0 | −5.1 |
| 3 | 9 | −5.1 | +0.2 | −1.3 | −6.2 |
| 4 | 7* | −6.0 | −3.1 | −1.3 | −10.4 |

*Averages do not include dead animal.

The average loss for Group 4 was 10.4 lbs, highly significant ($p<0.01$) greater than the average loss in Groups 1, 2 and 3. There is no significant different between the latter three groups. If the calf that died (125 lbs. initially) is included in the above calculations, then the average total body weight loss for group 4 was 24.7 lbs.

4. Weight loss (lbs.) for all calves during study period:

Table 10

| Group | Number of Calves | Study Period (days) 1 thru 3 | 4 and 5 | 6 thru 12 | Average Total Loss Lbs |
|---|---|---|---|---|---|
| 1 | 12 | −4.8 | −1.0 | +1.2 | −4.6 |
| 2 | 13 | −3.7 | −0.8 | −0.4 | −4.9 |
| 3 | 12 | −4.8 | +0.5 | −1.3 | −5.6 |
| 4 | 12* | −6.3 | −1.8 | −0.1 | −8.2 |

*Averages do not include dead animal.

The average loss for Group 4 was 8.2 lbs, significantly ($p<0.05$) greater than the loss for Groups 1, 2 and 3. There were no significant differences between the latter three groups. If the dead calf is included in the above calculations, then the average total body weight loss was 17.2 lbs.

Presence of scours at start of fifth (last) day of regimen with test formulation.

Table 4

Scours Present

| Group | Number of Calves | | % of Calves in Group having Scours |
|---|---|---|---|
| | Yes | No | |
| 1 | 7 | 5 | 58% |
| 2 | 4 | 9 | 31% |
| 3 | 4 | 8 | 33% |
| 4 | 12 | 0 | 100% |

There was a significant ($p<0.01$) difference in the frequency of observed scours on the fifth day of the study between Group 4 and Groups 1, 2 and 3. There were no significant differences between the latter three groups.

Duration of scours: The number of days of scouring were calculated for each animal to the nearest day. The results were:

Table 2

| | Treatment Group | | | |
|---|---|---|---|---|
| | 1 | 2 | 3 | 4 |
| Average (days) | 4.5 | 4.2 | 4.4 | 7.6 |

Analysis indicates that Group 4 had a highly significantly ($p<0.001$) longer duration of scouring than Groups 1, 2 and 3. There were no significant differences between the latter three groups.

Clinical Results: On day 5 after start of scours, the veterinarian judged the medical condition of the calves. The results were as follows:

Table 6

| Group | Medical Condition on Day 5 | | | | |
|---|---|---|---|---|---|
| | Good | Fair | Poor | None | Worse |
| 1 | 12(100)* | 0 | 0 | 0 | 0 |
| 2 | 12( 92) | 1 | 0 | 0 | 0 |
| 3 | 10( 83) | 2 | 0 | 0 | 0 |
| 4 | 3( 25) | 7 | 1 | 0 | 1** |

*Percent of total sample is in parentheses.
**Animal died. Not stated for another animal in Group 4.

There was a significant ($p<0.01$) difference in distributions between Group 4 and Groups 1, 2 and 3.

Thus it can be seen that our composition and method are considerably more effective than the antibiotic treatments now conventionally employed and further even more surprisingly is effective even without the use of antibiotics and/or milk replacer.

The particular test diet, of our invention, used in the above tests had the following composition.

| Test Diet Composition | | | |
|---|---|---|---|
| Component | Dry Composition % wt./wt. | Amount per Two Quarts of Aqueous Solution | Amount per Liter of Aqueous Solution |
| Sodium Chloride | 7.5 | 6.37 gm | 3.04 gm |
| Calcium Chloride (dihydrate) | 0.7 | 0.60 | 0.29 |
| Magnesium Chloride (hexahydrate) | 1.0 | 0.85 | 0.41 |
| Sodium Bicarbonate | 9.9 | 8.44 | 4.03 |
| Potassium Citrate, Tribasic (monohydrate) | 6.7 | 5.66 | 2.70 |
| Glycine | 20.5 | 17.39 | 8.30 |
| Glucose (anhydrous) (M.W. - 180.16) | 53.7 | 45.69 | 21.80 |
| TOTAL | 100.0% | 85.00 gm | 40.57 gm |

EXAMPLE 2

This example illustrates the varying shelf-life of four representative dry compositions of the invention. In this example, samples from four representative compositions, of the invention, are placed in glass vials at varying moisture contents, sealed, and then stored at various temperatures. The samples are periodically examined for shelf-life based on caking and discoloration. The formulations and results of these tests are summarized in the following tables.

TABLE A

Stability Test Compositions

| Formulation I | Weight % (Dry) | Dry Weight % of Formulation I but without Dextrose |
|---|---|---|
| Sodium chloride | 11.6 | 26.2 |
| Calcium gluconate | 2.2 | 5.0 |
| Magnesium sulfate | 0.6 | 1.4 |
| Monopotassium phosphate | 8.7 | 19.6 |
| Glycine | 21.2 | 47.8 |
| Dextrose, anhydrous | 55.7 | — |

| Formulation II | Weight % (Dry) | Dry Weight % of Formulation II but without Dextrose |
|---|---|---|
| Sodium chloride | 7.7 | 17.0 |
| Calcium gluconate | 2.2 | 4.8 |
| Magnesium sulfate | 0.6 | 1.3 |
| Monopotassium phosphate | 8.6 | 19.2 |
| Sodium acetate | 5.0 | 11.2 |
| Glycine | 20.9 | 46.5 |
| Dextrose, anhydrous | 55.0 | — |

| Formulation III | Weight % (Dry) | Dry Weight % of Formulation III but without Dextrose |
|---|---|---|
| Sodium chloride | 7.3 | 15.3 |
| Calcium gluconate | 2.1 | 4.3 |
| Magnesium sulfate | .6 | 1.2 |
| Sodium bicarbonate | 9.7 | 20.1 |
| Monopotassium phosphate | 8.2 | 17.2 |
| Glycine | 19.9 | 41.9 |
| Dextrose, anhydrous | 52.2 | — |

| Formulation IV | Weight % (Dry) | Dry Weight % of Formulation IV but without Dextrose |
|---|---|---|
| Sodium chloride | 7.5 | 16.5 |
| Calcium gluconate | 2.2 | 5.0 |
| Magnesium sulfate | 0.6 | 1.3 |
| Sodium bicarbonate | 10.0 | 21.9 |
| Potassium chloride | 4.7 | 10.4 |
| Glycine | 20.7 | 45.9 |
| Dextrose, anhydrous | 54.3 | — |

The results of the respective formulation stability tests are summarized as follows:

Table 1

**CALF SCOUR ORAL ELECTROLYTES
ONE UNIT PACKAGE AT 2 MONTHS
FORMULATION NO. I**

| °C | % MOISTURE | CAKING | DISCOLORATION | GAS (cc) |
|---|---|---|---|---|
| 60° | 1.3 | Yes | LIGHT BROWN | NONE |
| 60° | 0.6 | Yes | DARK TAN | NONE |
| 60° | 0.3 | Yes | TAN | NONE |
| 45° | 1.3 | Yes | OFF WHITE | NONE |
| 45° | 0.6 | Yes | OFF WHITE | NONE |
| 45° | 0.3 | SLIGHT | NONE | NONE |
| R.T.* | 1.3 | NONE | NONE | |
| R.T. | 0.6 | NONE | NONE | |
| R.T. | 0.3 | NONE | NONE | |

(*approximately 20°C)

FORMULATION NO. II

| °C | % MOISTURE | CAKING | DISCOLORATION | GAS (cc) |
|---|---|---|---|---|
| 60° | 1.3 | Yes | BROWN | NONE |
| 60° | 0.6 | Yes | BROWN SPOTS | NONE |
| 60° | 0.3 | YES | LIGHT BROWN SPOTS | NONE |
| 45° | 1.3 | Yes | TAN SPOTS | NONE |
| 45° | 0.6 | Yes | LIGHT TAN SPOTS | NONE |
| 45° | 0.3 | Slight | OFF WHITE | NONE |
| R.T. | 1.3 | Slight | NONE | |
| R.T. | 0.6 | No | NONE | |
| R.T. | 0.3 | No | NONE | |

FORMULATION NO. III

| °C | % MOISTURE | CAKING | DISCOLORATION | GAS (cc) |
|---|---|---|---|---|
| 60 | 1.2 | Yes | BLACK PLASTIC MASS | 41 |
| 60 | 0.6 | Yes | BLACK PLASTIC MASS | 29 |
| 60 | 0.3 | Yes | BROWN SPOTS | 20 |
| 45 | 1.2 | Yes | TAN SPOTS | 15 |
| 45 | 0.6 | Yes | LIGHT TAN SPOTS | 9 |
| 45 | 0.3 | Yes | OFF WHITE | 6 |
| R.T. | 1.2 | No | NONE | |
| R.T. | 0.6 | No | NONE | |
| R.T. | 0.3 | No | NONE | |

FORMULATION NO. IV

| °C | % MOISTURE | CAKING | DISCOLORATION | GAS (cc) |
|---|---|---|---|---|
| 60 | 1.2 | Yes | DARK BROWN PLASTIC MASS | 27 |
| 60 | 0.6 | Yes | DARK BROWN PLASTIC MASS | 14 |
| 60 | 0.3 | Yes | BROWN SPOTS | 12 |
| 45 | 1.2 | Yes | LIGHT BROWN | 4 |
| 45 | 0.6 | Yes | TAN SPOTS | 2 |
| 45 | 0.3 | Slight | TAN SPOTS | 1 |
| R.T. | 1.2 | NO | NONE | |
| R.T. | 0.6 | No | NONE | |
| R.T. | 0.3 | No | NONE | |

Based on the above tests, Formulation No. I is very substantially superior to Formulation No.'s II, III and IV with respect to stability, and Formulation No. IV is superior to Formulation No.'s II and III. The two months studies at 45°C can be extrapolated to ambient or room temperature stabilities of at least nine months.

EXAMPLE 3

This example illustrates the enhanced shelf-life which is obtained by packaging dextrose separately. In this example, the same procedures are followed as in Example 2 except that the non-dextrose containing compositions listed in Table A of Example 2 are used in place of the dextrose containing compositions. The results of these tests are summarized in the following tables.

TABLE 5

**CALF SCOUR ORAL ELECTROLYTES
TWO UNIT PACKAGE AT 2 MONTHS
(DEXTROSE AS A SEPARATE PACKAGE)
Formulation Ia**

| °C | % MOISTURE | CAKING | DISCOLORATION | GAS (cc) |
|---|---|---|---|---|
| 60° | 0.9 | Yes | LIGHT TAN | NONE |
| 60° | 0.5 | Slight | NONE | NONE |
| 60° | 0.3 | Slight | NONE | NONE |
| 45° | 0.9 | Yes | NONE | NONE |
| 45° | 0.5 | NONE | NONE | NONE |
| 45° | 0.3 | NONE | NONE | NONE |
| R.T. | 0.9 | NONE | NONE | |
| R.T. | 0.5 | NONE | NONE | |
| R.T. | 0.3 | NONE | NONE | |

Formulation IIa

| °C | % MOISTURE | CAKING | DISCOLORATION | GAS (cc) |
|---|---|---|---|---|
| 60° | 0.9 | Yes | LIGHT TAN | NONE |
| 60° | 0.5 | Yes | OFF WHITE | NONE |
| 60° | 0.3 | Yes | OFF WHITE | NONE |
| 45° | 0.9 | Yes | NONE | NONE |
| 45° | 0.5 | Yes | NONE | NONE |
| 45° | 0.3 | Yes | NONE | NONE |
| R.T. | 0.9 | NONE | NONE | |
| R.T. | 0.5 | NONE | NONE | |
| R.T. | 0.3 | NONE | NONE | |

Formulation IIIa

| °C | % MOISTURE | CAKING | DISCOLORATION | GAS (cc) |
|---|---|---|---|---|
| 60° | 0.9 | Yes | LIGHT TAN | 13 |
| 60° | 0.5 | Yes | OFF WHITE | 9 |
| 60° | 0.3 | Yes | OFF WHITE | 8 |
| 45° | 0.9 | Yes | NONE | 9 |
| 45° | 0.5 | Slight | NONE | 3 |
| 45° | 0.3 | Slight | NONE | 3 |
| R.T. | 0.9 | Slight | NONE | |
| R.T. | 0.5 | No | NONE | |
| R.T. | 0.3 | No | NONE | |

Formulation IVa

| °C | % MOISTURE | CAKING | DISCOLORATION | GAS (cc) |
|---|---|---|---|---|
| 60° | 0.9 | Yes | OFF WHITE | 1 |
| 60° | 0.5 | None | NONE | NONE |
| 60° | 0.3 | None | NONE | NONE |
| 45° | 0.9 | Yes | OFF WHITE | 3 |
| 45° | 0.5 | None | NONE | NONE |
| 45° | 0.3 | None | NONE | NONE |
| R.T. | 0.9 | None | NONE | |
| R.T. | 0.5 | None | NONE | |
| R.T. | 0.3 | None | NONE | |

As in the case of the single package formulations (Example 2), Formulation Ia is substantially superior to Formulations II, III and IV, and Formulation IV is superior to Formulations II and III. The two month stabilities at 45°C can be extrapolated to ambient or room temperature stabilities of at least nine months.

EXAMPLE 4

In this example further calf studies are made to determine the possible effectiveness of the composition in treating severe cases of scours wherein dehydration and possible secondary infection has already taken place. In this example a group of 50 calves are very severely infected with scours pathogens. The animals are then divided into eight groups and treated with various combinations of antibiotics, control electrolytes, and our composition. Unfortunately, the scours was so severe that none of the treatments were effective and resulted in an overall mortality rate, for the experiment, of about 80%. The experiment serves to illustrate the need for early treatment of scours before the scours has progressed too far.

Obviously many modifications and variations of the invention, described herein above and below in the claims, can be made without departing from the essence and scope thereof.

What is claimed is:

1. A dry stable powder composition for the treatment and prevention of scours and dehydration in domestic animals which consists essentially of from about 20 to 23% glycine; 54 to 57% anhydrous glucose; 10.5 to 12.5% sodium chloride; 8 to 10% monopotassium phosphate; .5 to .7% magnesium sulfate; 2 to 2.4% calcium gluconate, and wherein said composition contains less than 3% by weight, water.

2. The composition of claim 1 wherein said composition comprises less than 1%, by weight, water.

3. The composition of claim 1 wherein said anhydrous glucose is anhydrous dextrose.

* * * * *